United States Patent
Stidworthy et al.

(10) Patent No.: US 9,002,908 B2
(45) Date of Patent: Apr. 7, 2015

(54) SYSTEM AND METHOD FOR AUTOMATICALLY ROUTING AND MANAGING STORED DOCUMENTS BASED ON DOCUMENT CONTENT

(75) Inventors: Paul Stidworthy, Exeter (GB); Jamie Peter Bowen, Nr Wells (GB); Andrew Beattie, Wiveliscombe (GB)

(73) Assignee: CA, Inc., New York, NY (US)

( * ) Notice: Subject to any disclaimer, the term of this patent is extended or adjusted under 35 U.S.C. 154(b) by 489 days.

(21) Appl. No.: 13/159,567

(22) Filed: Jun. 14, 2011

(65) Prior Publication Data

US 2012/0323976 A1 Dec. 20, 2012

(51) Int. Cl.
| | |
|---|---|
| G06F 7/00 | (2006.01) |
| G06F 17/30 | (2006.01) |
| G06N 5/00 | (2006.01) |
| G06F 3/06 | (2006.01) |
| G06F 17/00 | (2006.01) |
| G06N 5/02 | (2006.01) |

(52) U.S. Cl.
CPC ........ *G06F 17/30011* (2013.01); *G06F 3/0643* (2013.01); *G06F 3/0649* (2013.01); *G06F 17/30082* (2013.01)

(58) Field of Classification Search
None
See application file for complete search history.

(56) References Cited

U.S. PATENT DOCUMENTS

| | | | | |
|---|---|---|---|---|
| 6,021,415 | A * | 2/2000 | Cannon et al. | 707/206 |
| 2006/0064408 | A1* | 3/2006 | Enbutsu et al. | 707/3 |
| 2008/0177805 | A1* | 7/2008 | Kushwah et al. | 707/203 |
| 2010/0094822 | A1* | 4/2010 | Kelapure | 707/705 |

OTHER PUBLICATIONS

Cloud Storage Gateway webpage-Wikipedia, the free encyclopedia, Sep. 2010, pp. 1-2.*

* cited by examiner

*Primary Examiner* — James Trujillo
*Assistant Examiner* — Cheryl M Shechtman
(74) *Attorney, Agent, or Firm* — Myers Bigel Sibley & Sajovec, P.A.

(57) ABSTRACT

A system and method for routing and managing documents based on document content comprises obtain a document, determine a classification for the document based on the document content, determine a storage location for the document based on the document classification, determine whether the document is stored in the determined storage location, when the document is stored in the determined storage location, update the document in the determined storage location, when the document is not stored in the determined storage location, determine whether the document is stored in another storage location, when the document is stored in another storage location, add the document in the determined storage location and delete the document from the other storage location, and when the document is not stored in the other storage location, add the document to the determined storage location.

20 Claims, 8 Drawing Sheets

SYSTEM AND METHOD FOR AUTOMATICALLY ROUTING AND MANAGING STORED DOCUMENTS BASED ON DOCUMENT CONTENT

FIELD

The present disclosure relates generally to document storage, and more particularly to routing and managing stored documents based on document content.

BACKGROUND

Whenever a document is stored, either on company owned hardware or with an Internet Storage Provider (Cloud based storage), this storage comes with a price and associated risks. Within a company's own infrastructure, the decision of where to store data is very important. For example Tier III storage will be cheap but may offer no redundancy or backup protection, whist storing data in Tier I is expensive and affords protection against downtime and data loss.

The proliferation of Cloud based storage has made it possible to store data with no capital expenditure which makes it very attractive to companies looking to manage storage costs. However, storing data in the Cloud brings with it even more complication when it comes to the decision on where to store data; big differences exist between Cloud storage providers on both cost and security. This is compounded by the fact that some providers locate their datacenters in different jurisdictions which can have significant legal implications for the storage of certain classifications of data.

Because there is currently no way to automate the routing of data based on its content and/or classification to the most appropriate storage provider, companies must take a 'blanket' approach to storage by providing their employees with storage locations and a policy on how they are used. This manual approach can lead to some data being stored inappropriately, with non-sensitive and unregulated data stored in expensive storage and sensitive or regulated data being stored in cheap, unsecured storage.

Another important aspect affecting the cost, security and compliance responsibilities of data storage is data lifetime. For regulatory reasons certain classifications of data must be kept for a specified time period. However, storing data for longer than necessary also has a big impact on cost. Again a company must currently adopt a 'blanket' approach to data lifetime management by archiving data after a certain date. Issues surrounding this approach include data being archived too soon (expensive to recover if necessary), too late (incurs additional storage expense) or being unnecessarily archived when out-of-date data can be simply deleted.

Systems currently exist that will seamlessly move data between storage tiers and abstract the complexity of interacting with Cloud storage providers, but these system do not take account the document content or data classification.

BRIEF SUMMARY

An inventive system and method for managing and storing documents based on document content is presented. The system uses classification of the data to select appropriate storage to maximize availability, maximize security, maximize compliance, and minimize storage costs; the balance between these categories being defined in the Storage Policy Rules. Document classification is performed based on the document content only. Once a document is classified, a rules engine uses the classification and given storage rules to determine the appropriate storage location. Data is classified and appropriate storage is chosen before the data ever reaches the Cloud, or other storage location, thus minimizing the amount of data being stored in an inappropriate location, even temporarily. Reclassification of data can be performed continually, whenever the data changes, and whenever the Classification Rules change, thus preventing consequential storage in an inappropriate location.

In addition, Time Based Storage Policy Rules can be configured. Time Based Classification Rules are used to enforce the retention of documents for a minimum specified period and/or enforce the shredding (secure deletion) of documents after an elapsed time period. In the inventive technique, documents are automatically shredded when the expiry date passes.

The system for managing and storing documents based on document content can comprise a processor, a data repository, one or more servers and a module operable to obtain a document, determine a classification for the document based on the document content and storage rules, determine a storage location for the document based on the document classification, determine whether the document is stored in the determined storage location, when the document is stored in the determined storage location, update the document in the determined storage location, when the document is not stored in the determined storage location, determine whether the document is stored in another storage location, when the document is stored in an other storage location, add the document in the determined storage location and delete the document from the other storage location, and when the document is not stored in the other storage location, add the document to the determined storage location.

In one aspect, the module is further operable to determine whether an entry for the document exists in a storage map, when the entry exists and when the document is stored in the other location, update the entry for the document to the storage map, and when the entry does not exist, add the entry for the document to the storage map. In one aspect, the storage location is further determined in accordance with provider policy. In one aspect, the document is obtained using a storage gateway. In one aspect, the document is added to the determined location and the document is updated in the determined storage location using a storage gateway performing on the document one or more of caching, encrypting, de-duplicating, and compressing.

The method for routing and managing documents based on document content can comprise steps of obtaining a document, determining a classification for the document based on the document content, determining a storage location for the document based on the document classification, determining whether the document is stored in the determined storage location, when the document is stored in the determined storage location, updating the document in the determined storage location, when the document is not stored in the determined storage location, determining whether the document is stored in an other storage location, when the document is stored in the other storage location, adding the document in the determined storage location and deleting the document from the other storage location, and when the document is not stored in the other storage location, adding the document to the determined storage location.

In one aspect, the method can further comprise steps of determining whether an entry for the document exists in a storage map, when the entry exists and when the document is stored in the other location, updating the entry for the document to the storage map, and when the entry does not exist, adding the entry for the document to the storage map. In one aspect, the step of determining the storage location for the document is further based on provider policy. In one aspect, the step of obtaining is performed using a storage gateway. In one aspect, the steps of adding the document to the determined location and updating the document in the determined storage location are performed using a storage gateway additionally performing on the document zero or more of caching, encrypting, de-duplicating, and compressing.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

An inventive system and method for routing and managing stored documents based on document content is presented. The novel approach consists of four main components which work together to seamlessly route documents according to their content to appropriate storage providers and to manage stored documents in accordance with their changing contents.

Figure 1:
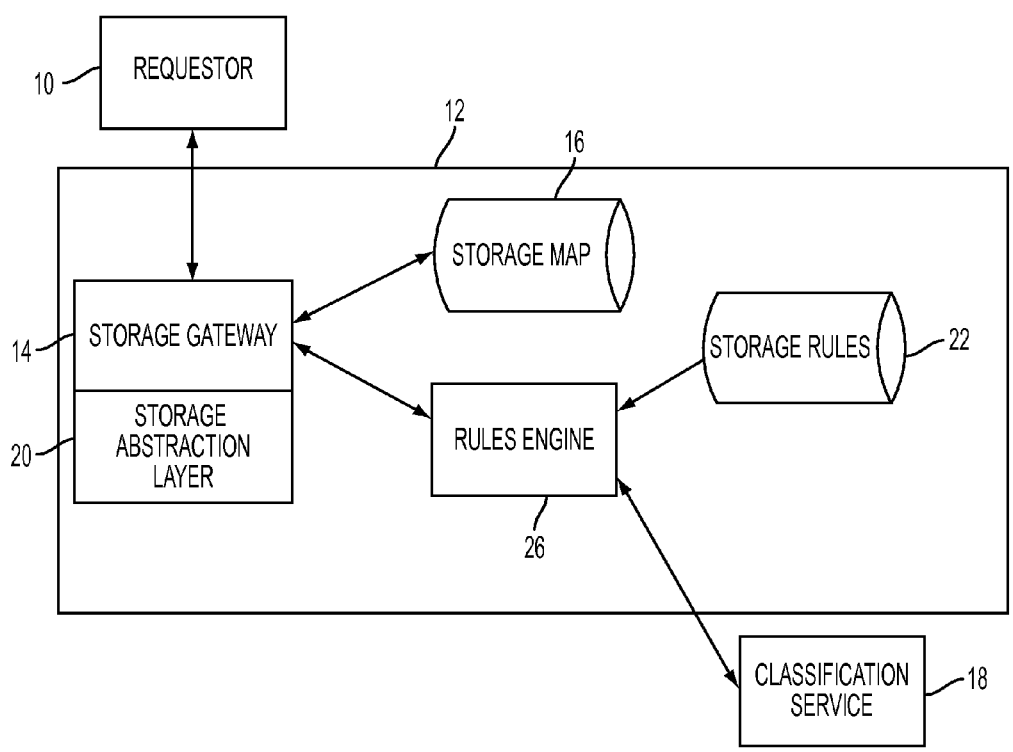
FIG. 1 is a schematic diagram of an embodiment of the present invention.

A schematic diagram of an embodiment of the inventive system is shown in FIG. 1. In this embodiment, the novel system comprises a machine 10, such as a CPU, processor, server or the like, from which requests can be made regarding manipulating, e.g., adding, deleting, updating, retrieving, etc., documents. The system also comprises another machine or machines 12 housing the components of the system, including Storage Gateway 14, Storage Map 16, Classification Service 18, Storage Abstraction Layer 20, and a Rules Engine 26. In addition, one or more data repositories for Storage Rules 22 are provided. A data repository can be a storage device such as a hard disk, a memory, etc. Each of these components will be described in more detail below.

The first component is Storage Abstraction Layer 20, which provides a single, common Application Program Interface (API) that can be used to access and modify data stored in multiple and different storage technologies. The Storage Gateway 14 can provide services that add value to the inventive technology as a whole; these services can which include, but are not limited to: Caching, for improved access times for frequently used documents; Encryption, for improved security of stored documents; Compression, for improved access times and lower storage costs; De-duplication, to prevent the unnecessary duplication of data in storage, cutting down storage requirements and lowing storage costs. Technology with the ability to provide common methods to access multiple and differing storage providers and provide ancillary services such as caching already exist in the public domain.

The second component is Storage Map 16, which stores the location and classification of each document in a fast, robust Directory. Alongside the document location, Storage Map also records metadata such as access frequency and size. A user interface to the Storage Map can allow Information Officers to audit and manage the company's data.

The third component is a Classification Service 18 that analyses the content of documents, and categorizes them according to a predetermined company or corporate policy.

The fourth component is a Storage Gateway 14, which provides the core component of the novel system, bringing each of the other components or sub-systems together to manage the storage of a company's data. Requests to add, delete, modify and retrieve documents are performed via the Storage Gateway. This component can be installed on-premises in which case it will appear to users as a standard Network Attached Storage (NAS) device. In the alternative, the Storage Gateway can be provided as a Cloud service, presenting a web-based storage interface (such as Web-based Distributed Authoring and Versioning (WebDAV)) to users.

In one embodiment, the inventive system uses the Classification Service 18 to categorize documents. In addition, the system is configured with Storage Rules 22 that determine what category(s) of document are stored in each provider. The Storage Rules additionally mandate how re-classification is scheduled when the document is updated.

Figure 2:
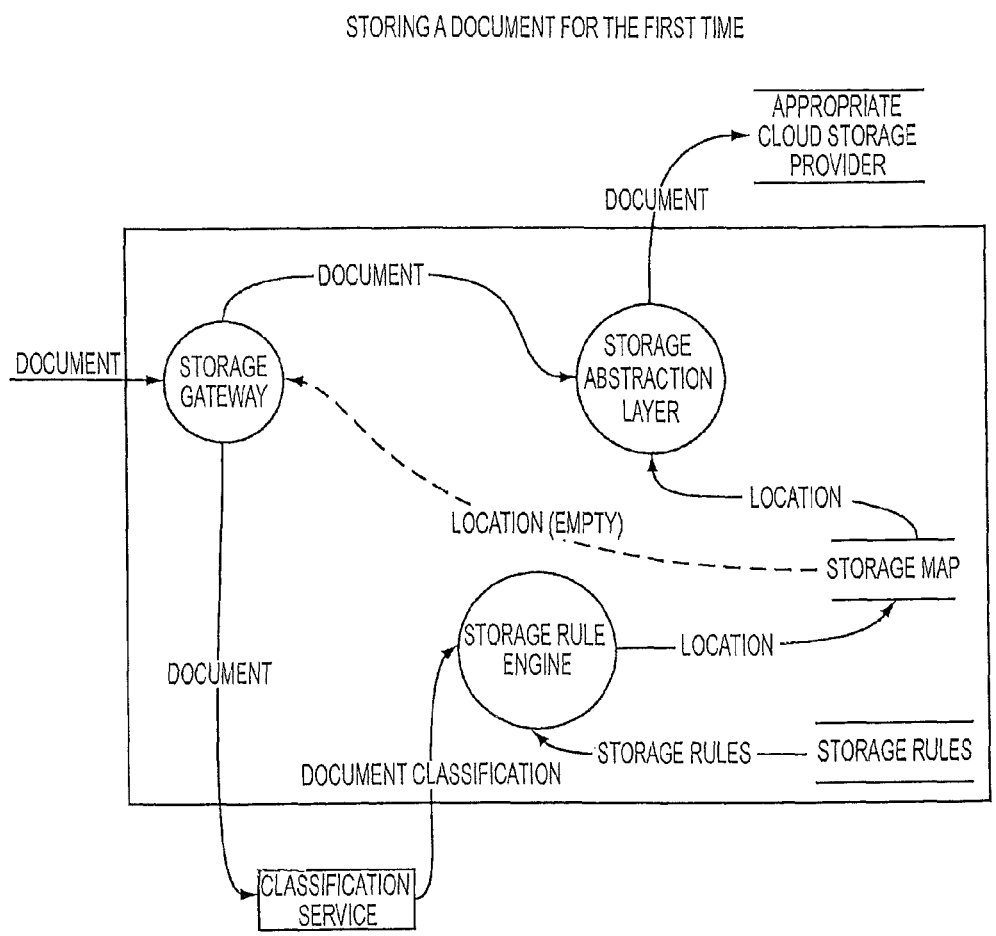
FIG. 2 is a schematic diagram of storing a document for the first time.

FIG. 2 is a schematic diagram of storing a document for the first time. When a request is made to the Storage Gateway to store a document for the first time, e.g., add a document to a company's document storage, the following steps are performed. The Storage Gateway queries the Storage Map for the document location but there is no entry since this is the first time the document has been stored. The Storage Gateway sends the document to the Classification Service for categorization. The Storage Rule Engine, which can be a sub-system of the Storage Gateway, uses the document classification and storage rules to determine where the document should be stored, e.g., the location of the document. Typically, the document's categorization is compared with the Storage Provider Policy to determine where the document should be stored. An entry is made in the Storage Map for the document's physical location and its metadata. The document storage request is passed to the Storage Abstraction Layer with the document's physical location, and the document is stored in the specified location.

Figure 3:
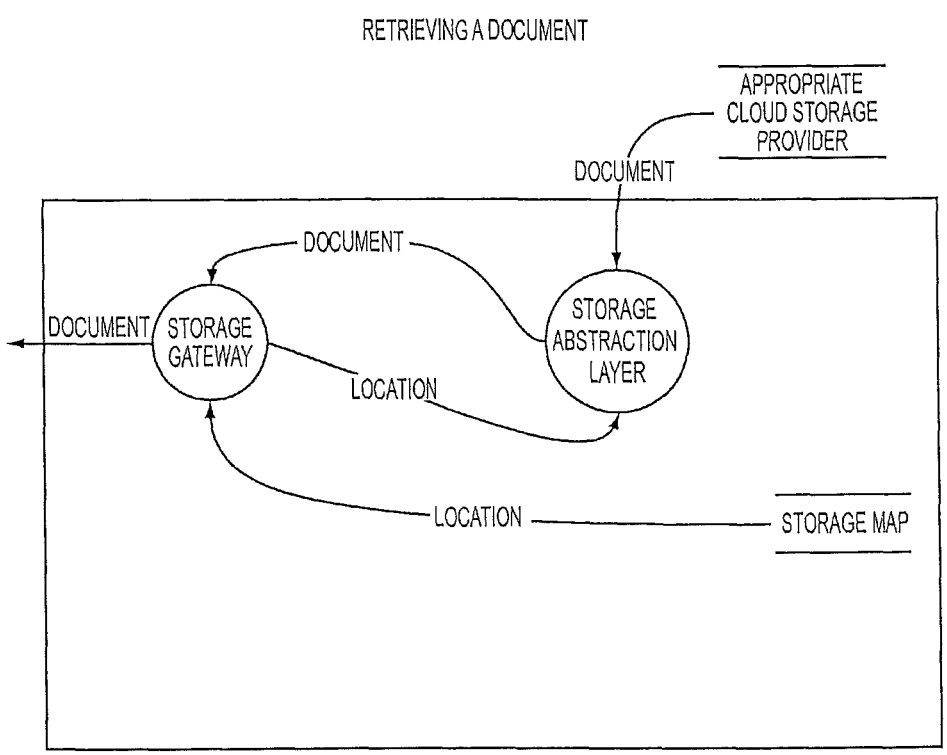
FIG. 3 is a schematic diagram of retrieving a document.

FIG. 3 is a schematic diagram of retrieving a document. When a request is made to the Storage Gateway to retrieve a document, the following steps are performed. The Storage Gateway queries the Storage Map for the document's location, that is, the document's entry in the Storage Map is located and the physical location is retrieved; access-frequency and last-access metadata are updated. The Storage Gateway passes the retrieval request to the Storage Abstraction Layer using the document's physical location. The Storage Abstraction Layer retrieves the document from the storage provider.

Steps for updating documents are now presented. When a request is made to the Storage Gateway to update a document, the following steps are performed. The Storage Gateway queries the Storage Map for the document location. The Storage Map returns the current, physical location of the document; access-frequency and last-access metadata are updated. The Storage Gateway determines that the document has been modified and may require re-classification. The document is sent to the Classification Service for classification. The Storage Rules Engine determines where the document should be stored based on its classification and the Storage Rules. The Storage Gateway compares the newly determined location with the existing, physical location and determines whether the location requires changing.

Figure 4:
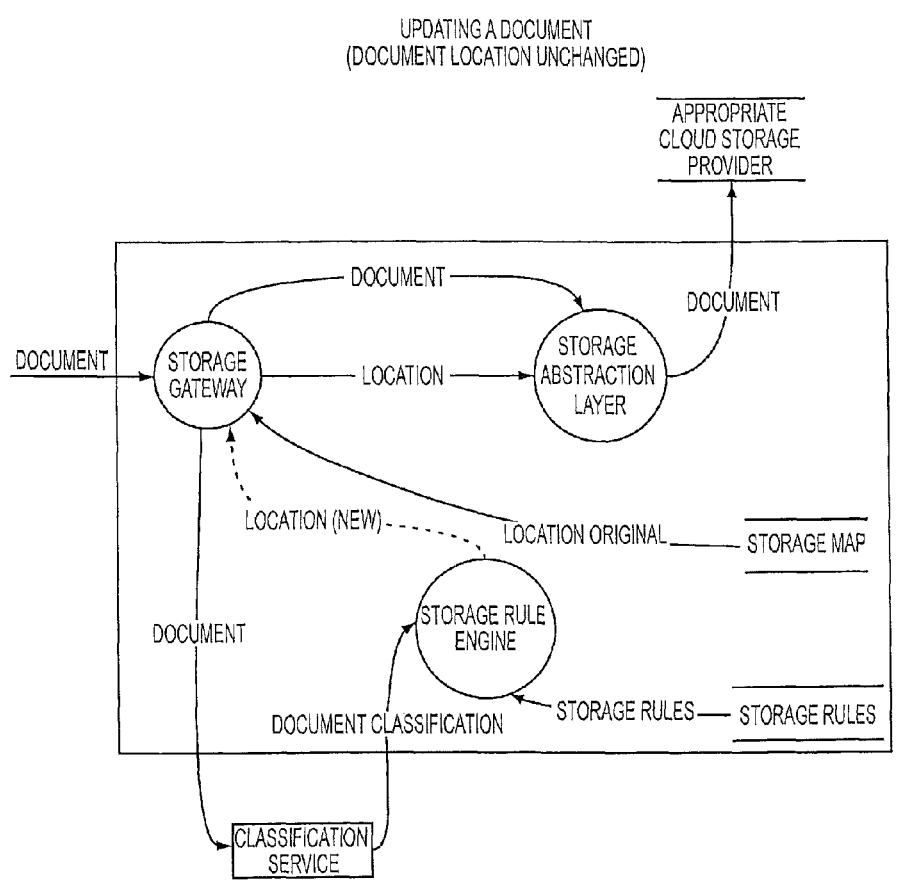
FIG. 4 is a schematic diagram of updating a document and not changing its location.

FIG. 4 is a schematic diagram of updating a document and not changing its location. If the document category is unchanged, a request is made of the Storage Abstraction Layer to update the document in its physical location.

If the document category is changed or updated, the appropriate storage provider is selected using the Storage Provider Policy. If the storage provider is unchanged, a request is made of the Storage Abstraction Layer to update the document in its current physical location.

Figure 5:
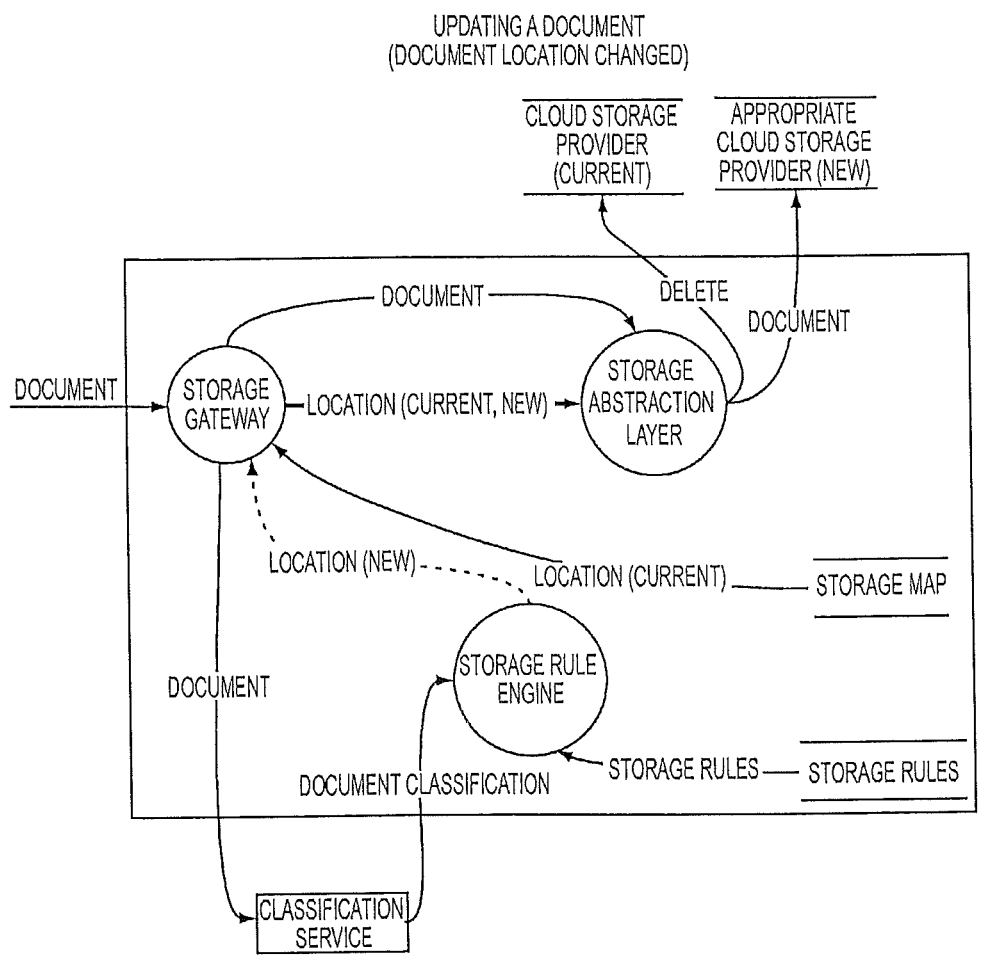
FIG. 5 is a schematic diagram of updating a document and changing its location.

FIG. 5 is a schematic diagram of updating a document and changing its location. The steps for updating documents are the same as those in FIG. 4. However, if the storage provider has changed, the steps of FIG. 5 are performed as follows. The document's Storage Map entry is updated and a request is made of the Storage Abstraction Layer to store the document in its new physical location. Once the document has been successfully stored in the new location, a request is made of the Storage Abstraction Layer to remove the document from its old location.

Figure 6:
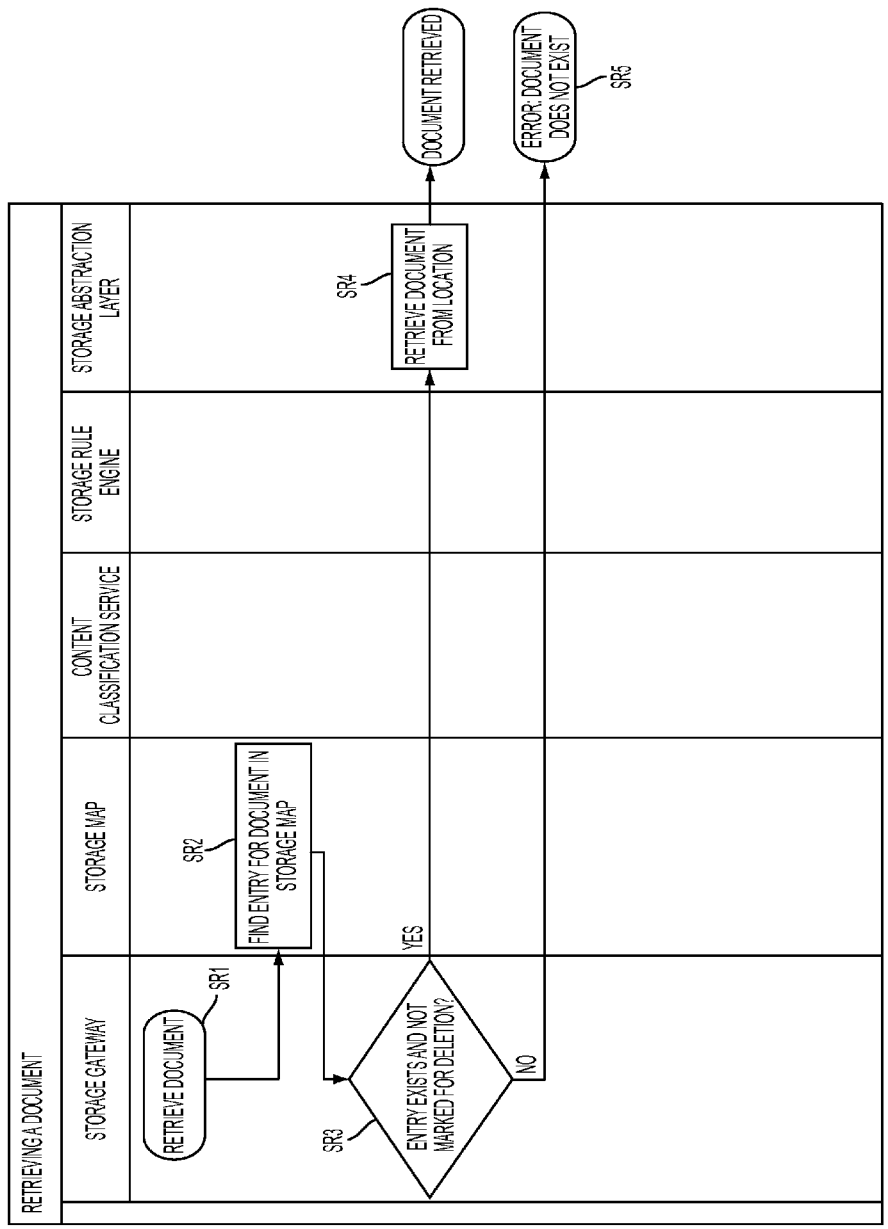
FIG. 6 is a flow diagram of the retrieve feature of the present invention.
Figure 7:
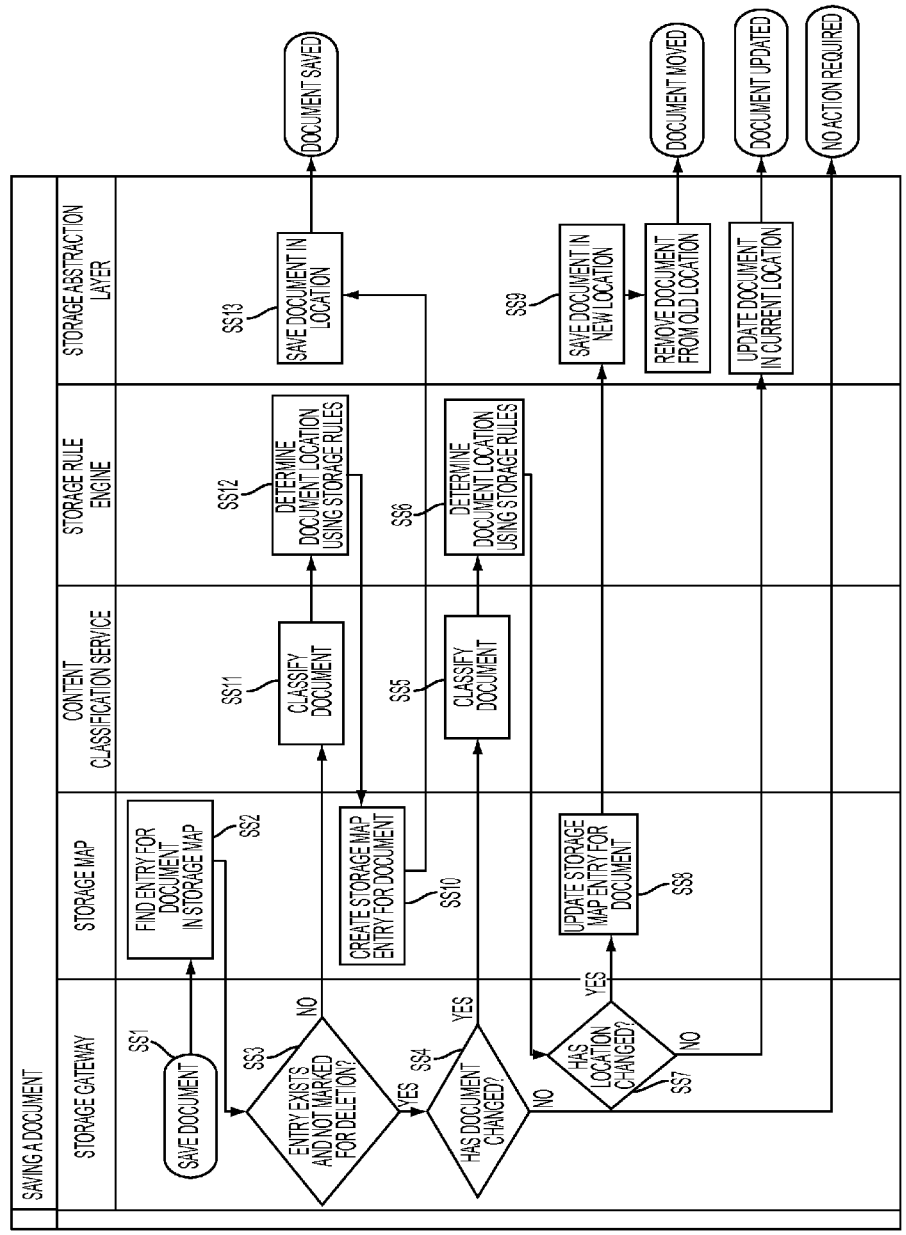
FIG. 7 is a flow diagram of the save feature of the present invention.
Figure 8:
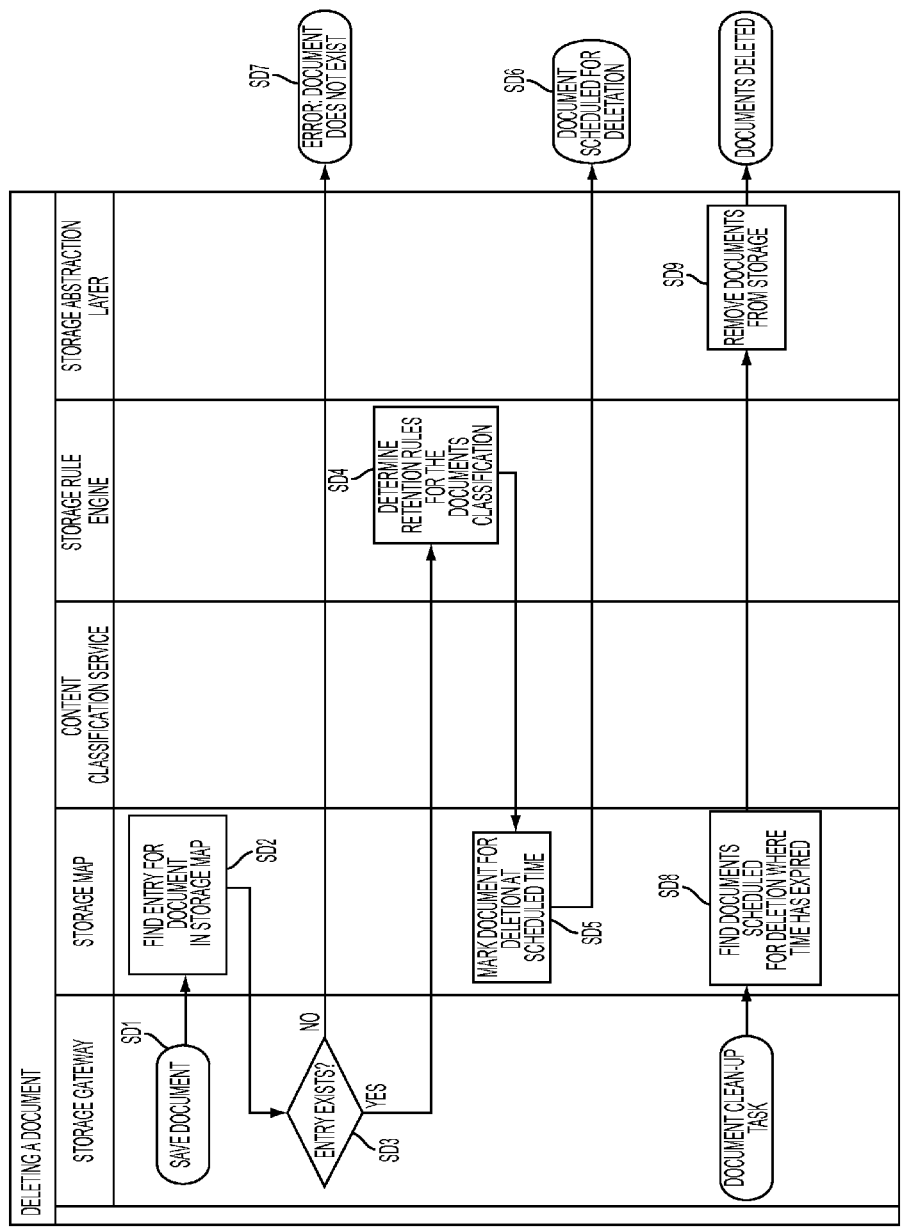
FIG. 8 is a flow diagram of the delete feature of the present invention.

The operation of the system in shown in the flow charts in FIGS. 6-8. FIG. 6 shows a flow diagram for the Retrieve feature, FIG. 7 shows a flow diagram for the Save feature, and FIG. 8 shows a flow diagram for the Delete feature.

FIG. 6 illustrates the process for retrieving a document. As shown in FIG. 6, a request is made to retrieve a document in step SR1. In step SR2, the request is received to find the entry for the document. If the entry exists and is not marked for deletion (SR3=YES), then the document is retrieved from its location in step SR4. Otherwise, if the entry does not exist or it is marked for deletion (SR3=NO), then an error message is generated in step SR5.

FIG. 7 illustrates the process for saving a document. In step SS1, a request is made to save a document. In step SS2, the request is received to find the entry for the document to be saved. If the entry exists and is not marked for deletion (SS3=YES), then the document is checked for changes. If the document has changed (SS4=YES), then the Classification Service is used to classify the changed document in step SS5. In step SS6, the document location is determined using Storage Rules. If the document location has changed (SS7=YES), then the Storage Map entry for the document is updated in step SS8. In step SS9, the document is saved in the new location and deleted from its previous location in step SS9.

If the entry does not exist or is marked for deletion (SS3=NO), then the document is classified using the Classification Service in step SS11. In step SS12, the document location is determined using the Storage Rules. In step SS10, an entry is created in the Storage Map. In step SS13, the document is saved.

If the document has not changed (SS4=NO), no action is required.

FIG. 8 illustrates the process for deleting a document, and the process for document clean-up. In step SD1, a request is made to delete a document. In SD2, the request is received to find the entry for the document to be deleted. If the entry exists (SD3=YES), then the retention rules for the document's classification are determined in step SD4. In step SD5, the document is marked for deletion. In step SD6, the document is scheduled for deletion. If the entry does not exist (SD3=NO), then an error message is generated in step SD7.

The document clean-up task includes the following steps. In step SD8, documents scheduled for deletion where time has expired are found. In step SD9, these documents are deleted from storage.

Advantageously, the present system enables intelligent storage of data, which can lower the associated costs whilst maintaining security and governance requirements in part because the spread of costs between 'low end' and 'high end' storage mediums and providers is significant.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for routing and managing documents based on document content, comprising:
   determining a classification for a document based on the document content;
   determining a storage location for the document based on the document classification and storage rules of a storage provider policy;
   determining whether the document is stored in the determined storage location;
   when the document is stored in the determined storage location, updating the document in the determined storage location;
   when the document is not stored in the determined storage location, determining whether the document is stored in another storage location;
   when the document is stored in the other storage location, adding the document to the determined storage location and deleting the document from the other storage location;
   when the document is not stored in the determined storage location or the other storage location, adding the document to the determined storage location;
   reclassifying the document with a new document classification responsive to an update of the document;
   determining a new storage provider for the document responsive to a comparison of the new document classification and the storage provider policy;
   adding the document to a new storage location of the new storage provider;
   deleting the document from the determined storage location; and
   updating an entry of the document in a storage map responsive to the adding the document to the new storage location.

2. The method according to claim 1, further comprising:
   determining whether an entry for the document exists in the storage map;
   when the entry exists and when the document is stored in the other storage location, updating the entry for the document to the storage map; and
   when the entry does not exist, adding the entry for the document to the storage map.

3. The method according to claim 1, wherein the document is obtained using a storage gateway.

4. The method according to claim 1, wherein the adding the document to the determined storage location and updating the document in the determined storage location further comprise performing on the document, using a storage gateway, one or more of caching, encrypting, de-duplicating, and compressing.

5. The method according to claim 1, wherein the determining a storage location further comprises comparing the document classification to the storage provider policy.

6. The method according to claim 1, further comprising:
   storing the entry of the document in the storage map, wherein the entry indicates the determined storage location and the document classification, and wherein the entry further comprises metadata comprising an access frequency of the document and a size of the document;
   updating the access frequency of the entry of the document responsive to a retrieval or update of the document; and
   providing the metadata of the document responsive to an audit operation for the document.

7. The method according to claim 1, further comprising:
   storing the determined storage location, the document classification and metadata comprising access frequency of the document and a size of the document as the entry of the document in the storage map;
   updating the access frequency of the entry of the document in the storage map responsive to the adding the document to the new storage location; and
   replacing the determined storage location with the new storage location in the entry in the storage map.

8. The method according to claim 1, wherein the determining the classification further comprises determining the classification for the document based on a predetermined company policy.

9. A system for routing and managing stored documents based on document content, comprising:
   at least one processor;
   a data repository;
   at least one memory coupled to the at least one processor and comprising computer readable program code embodied in the at least one memory that when executed by the at least one processor causes the at least one processor to perform operations comprising:
   determining a classification for a document based on the document content;
   determining a storage location for the document based on the document classification and storage rules of a storage provider policy;
   determining whether the document is stored in the determined storage location;
   when the document is stored in the determined storage location, updating the document in the determined storage location;
   when the document is not stored in the determined storage location, determining whether the document is stored in another storage location;
   when the document is stored in another storage location, adding the document to the determined storage location and deleting the document from the other storage location;
   when the document is not stored in the determined storage location or the other storage location, adding the document to the determined storage location;
   reclassifying the document with a new document classification responsive to an update of the document;
   determining a new storage provider for the document responsive to a comparison of the new document classification and the storage provider policy;
   adding the document to a new storage location of the new storage provider;
   deleting the document from the determined storage location; and
   updating an entry of the document in a storage map responsive to the adding the document to the new storage location.

10. The system according to claim 9, wherein the operations further comprise:
    determining whether an entry for the document exists in the storage map;
    when the entry exists and when the document is stored in the other storage location, updating the entry for the document to the storage map; and
    when the entry does not exist, adding the entry for the document to the storage map.

11. The system according to claim 9, wherein the document is obtained using a storage gateway.

12. The system according to claim 9, wherein the document is added to the determined storage location and the document is updated in the determined storage location using a storage gateway performing on the document one or more of caching, encrypting, de-duplicating, and compressing.

13. The system according to claim 9, wherein the operations further comprise:
   storing the determined storage location, the document classification and metadata comprising access frequency of the document and a size of the document as the entry of the document in the storage map;
   updating the access frequency of the entry of the document in the storage map responsive to the adding the document to the new storage location; and
   replacing the determined storage location with the new storage location in the entry in the storage map.

14. The system according to claim 9, wherein the operations further comprise determining the classification for the document based on a predetermined company policy.

15. A computer program product, comprising:
   a non-transitory computer readable storage medium comprising computer readable program code embodied in the medium that when executed by at least one processor causes the at least one processor to perform operations comprising:
   determining a classification for a document based on the document content;
   determining a storage location for the document based on the document classification and storage rules of a storage provider policy;
   determining whether the document is stored in the determined storage location;
   when the document is stored in the determined storage location, updating the document in the determined storage location;
   when the document is not stored in the determined storage location, determining whether the document is stored in another storage location;
   when the document is stored in the other storage location, adding the document to the determined storage location and deleting the document from the other storage location;
   when the document is not stored in the determined storage location or the other storage location, adding the document to the determined storage location;
   reclassifying the document with a new document classification responsive to an update of the document;
   determining a new storage provider for the document responsive to a comparison of the new document classification and the storage provider policy;
   adding the document to a new storage location of the new storage provider;
   deleting the document from the determined storage location; and
   updating an entry of the document in a storage map responsive to the adding the document to the new storage location.

16. The computer program product according to claim 15, wherein the operations further comprise:
   determining whether an entry for the document exists in the storage map;
   when the entry exists and when the document is stored in the other storage location, updating the entry for the document to the storage map; and
   when the entry does not exist, adding the entry for the document to the storage map.

17. The computer program product according to claim 15, wherein the document is obtained using a storage gateway.

18. The computer program product according to claim 15, wherein the adding the document to the determined storage location and updating the document in the determined storage location are performed using a storage gateway performing on the document one or more of caching, encrypting, de-duplicating, and compressing.

19. The computer program product according to claim 15, wherein the operations further comprise:
   storing the determined storage location, the document classification and metadata comprising access frequency of the document and a size of the document as the entry of the document in the storage map;
   updating the access frequency of the entry of the document in the storage map responsive to the adding the document to the new storage location; and
   replacing the determined storage location with the new storage location in the entry in the storage map.

20. The computer program product according to claim 15, wherein the operations further comprise determining the classification for the document based on a predetermined company policy.

* * * * *